No. 651,535. Patented June 12, 1900.
F. R. STAFFORD.
PROCESS OF MAKING SQUARE EDGED GOLD FILLED JEWELRY.
(Application filed Jan. 19, 1900.)
(No Model.) 4 Sheets—Sheet 1.
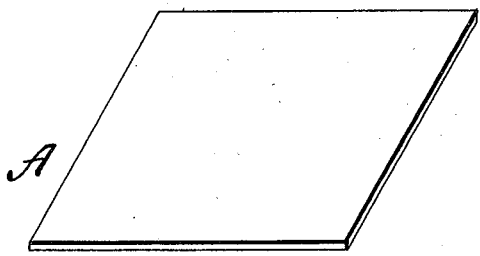
FIG. 1.
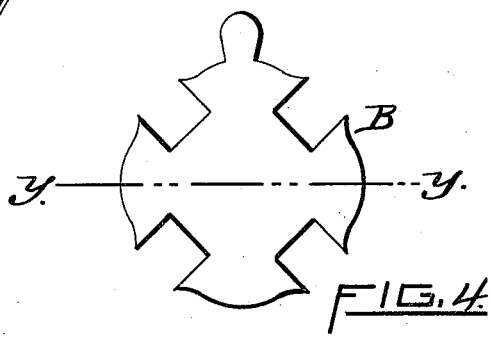
FIG. 4.
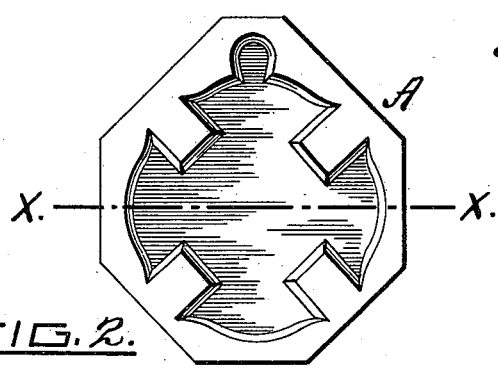
FIG. 2.
FIG. 5.
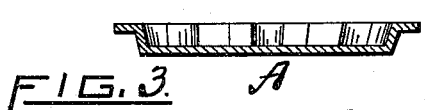
FIG. 3.
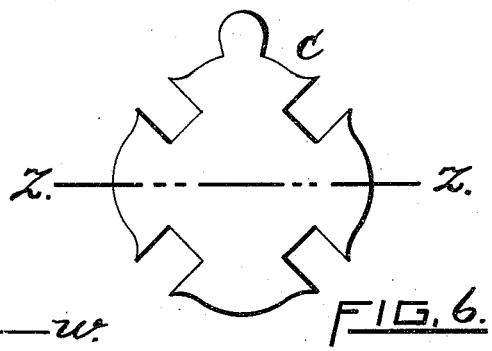
FIG. 6.
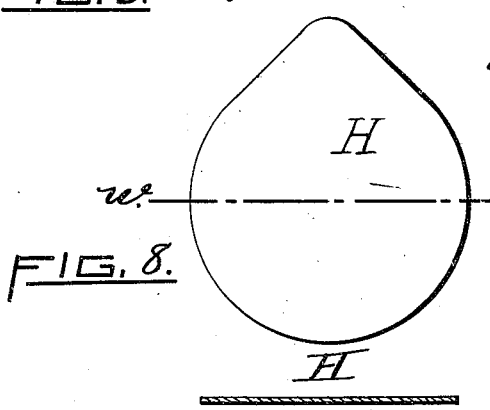
FIG. 8.
FIG. 7.
FIG. 9.
WITNESSES.
Charles T. Hannigan.
Howard A Lamprey
INVENTOR.
Frank R. Stafford
By Warren R. Perce
Atty.

No. 651,535. Patented June 12, 1900.
F. R. STAFFORD.
PROCESS OF MAKING SQUARE EDGED GOLD FILLED JEWELRY.
(Application filed Jan. 19, 1900.)
(No Model.) 4 Sheets—Sheet 2.
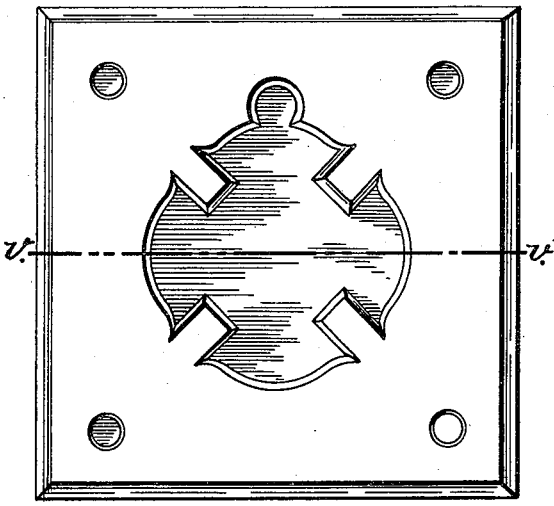
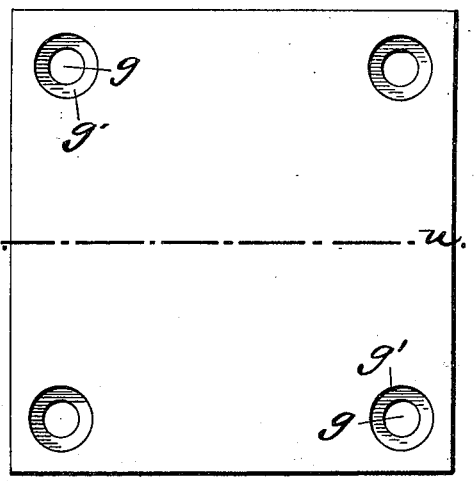
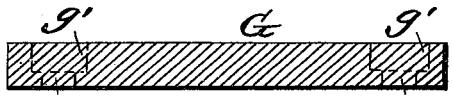
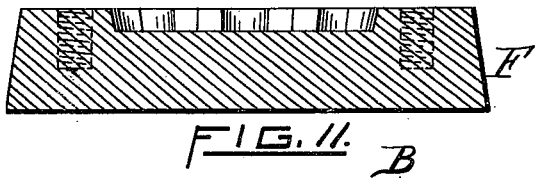
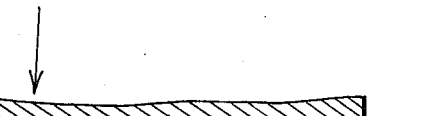
WITNESSES.
Charles T. Hannigan.
Howard A. Lamprey
INVENTOR.
Frank R. Stafford
By Warren R. Perce
Atty.
THE NORRIS PETERS CO., PHOTO-LITHO., WASHINGTON, D. C.

No. 651,535. Patented June 12, 1900.
F. R. STAFFORD.
PROCESS OF MAKING SQUARE EDGED GOLD FILLED JEWELRY.
(Application filed Jan. 19, 1900.)
(No Model.) 4 Sheets—Sheet 3.

WITNESSES.
Charles T. Hannigan.
Howard H. Lamprey

INVENTOR.
Frank R. Stafford
by Warren R. Perce
Atty.

No. 651,535. Patented June 12, 1900.
F. R. STAFFORD.
PROCESS OF MAKING SQUARE EDGED GOLD FILLED JEWELRY.
(Application filed Jan. 19, 1900.)
(No Model.) 4 Sheets—Sheet 4.
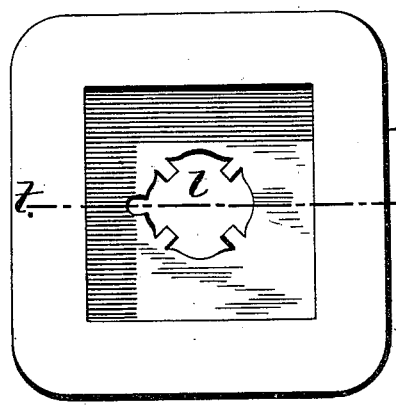
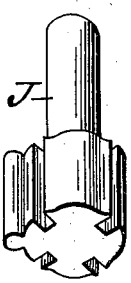
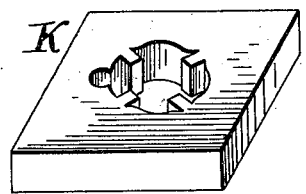
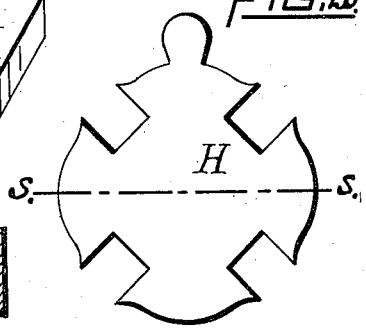
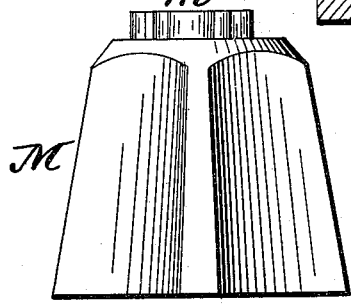
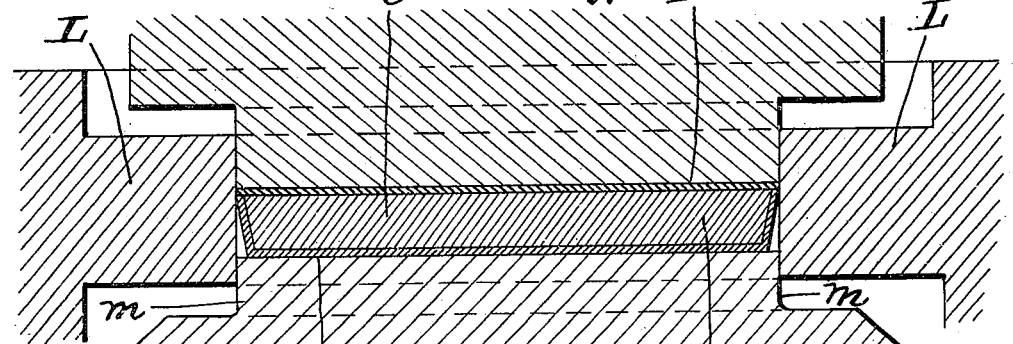
WITNESSES. Charles T. Hannigan. Howard A. Lamprey
INVENTOR. Frank R. Stafford By Warren R. Perce Atty.
THE NORRIS PETERS CO., PHOTO-LITHO., WASHINGTON, D. C.

UNITED STATES PATENT OFFICE.

FRANK R. STAFFORD, OF PROVIDENCE, RHODE ISLAND, ASSIGNOR TO CHARLES F. IRONS AND CHARLES A. RUSSELL, OF SAME PLACE.

PROCESS OF MAKING SQUARE-EDGED GOLD-FILLED JEWELRY.

SPECIFICATION forming part of Letters Patent No. 651,535, dated June 12, 1900.

Application filed January 19, 1900. Serial No. 2,056. (No model.)

*To all whom it may concern:*

Be it known that I, FRANK R. STAFFORD, a citizen of the United States, residing at Providence, in the county of Providence and State of Rhode Island, have invented certain new and useful Improvements in Processes of Manufacturing Square-Edged Gold-Filled Jewelry, of which the following is a specification, reference being had therein to the accompanying drawings.

Like letters indicate like parts.

Figure 16:
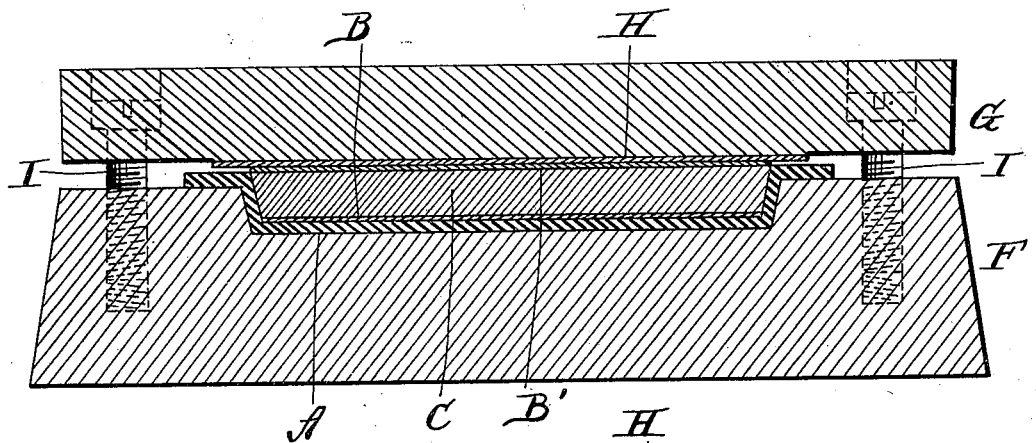
Figure 17:
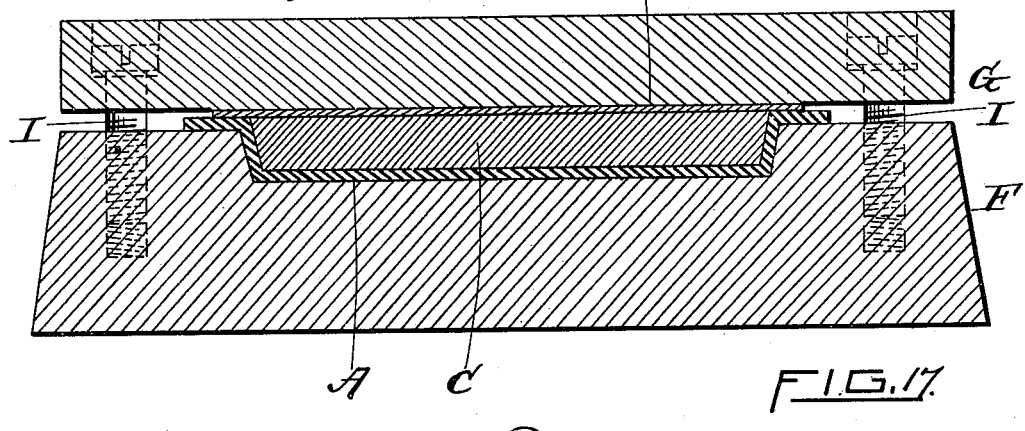
Figure 18:
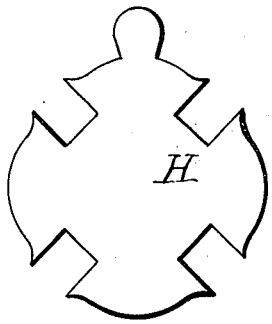

Figure 1 is a perspective view of the blank of gold stock which is to be operated upon by my improved process to constitute the bottom and side coverings or shell of a gold-filled charm. Fig. 2 is an inverted plan of said blank after it has been struck up by the first die operation and the corners of the blank are clipped off. Fig. 3 is a view of the same in cross-section on line $x\,x$ of Fig. 2. Fig. 4 shows in top plan a sheet of hard solder cut into the form of said charm. Fig. 5 is a view of the same in cross-section on line $y\,y$ of Fig. 4. Fig. 6 is a view in top plan of the filling-piece of brass or composition metal cut into the form of said charm. Fig. 7 is a view of the same in cross-section on line $z\,z$ of Fig. 6. Fig. 8 is a view in top plan of the cover or facing plate which is to constitute the upper surface of said charm when completed. Fig. 9 is a view of the same in cross-section on line $w\,w$ of Fig. 8. Fig. 10 is a view in top plan of the sweating or soldering die used in my improved process. Fig. 11 is a view of the same in cross-section on line $v\,v$ of Fig. 10. Fig. 12 is a view in top plan of the clamping-plate used in connection with said sweating or soldering die. Fig. 13 is a view of the same in cross-section on line $u\,u$ of Fig. 12. Fig. 14 is a central cross-sectional view of a forming-die and of the struck-up blank therein and of the solder and filling piece deposited in the depression of said struck-up blank, and also of a forcing plate or plunger to operate in combination with said die. Fig. 15 is a central cross-sectional view of the struck-up blank and of the solder and filling piece in the depression thereof after the operation illustrated in Fig. 14. Fig. 16 is a central cross-sectional view of the sweating-die and of the struck-up blank therein and of the solder and filling piece in the depression of said struck-up blank after said operation thereon, and also of another piece of solder and of the cover, together with the clamping-plate, in position for the sweating operation. Fig. 17 shows the same parts as in Fig. 16 after the sweating and pressing operation, except that in this figure the pieces of solder have disappeared, having been fused in position. Fig. 18 is a top plan view of the composite body so sweated and fused together after it has cooled and has been removed from the sweating-die and trimmed by cutting off the projecting flange of said body. Fig. 19 is a view in top plan of the collar used to square the edges of the charm. Fig. 20 is a view of the same in cross-section on line $t\,t$ of Fig. 19. Fig. 21 is a perspective view of one of the plungers used in my improved process. Fig. 22 is a perspective view of the cutter-plate. Fig. 23 is a side elevation of the forcer-block. Fig. 24 is a cross-sectional view of the forcer, forcer-block, and collar in operative position with the composite body of the charm placed ready for the forcing operation. Fig. 25 is a top plan view of the finished charm. Fig. 26 is a view of the same in cross-section on line $s\,s$ of Fig. 25.

My invention relates to the manufacture of gold-filled jewelry; and it consists of the novel method and process of the construction thereof hereinafter particularly described, as specifically set forth in the claims.

In the art of manufacturing gold jewelry those articles are commercially known as "gold filled" which have a gold or gold-plated shell or exterior portion made in two or more sections and having an inner or filling block or piece made of brass, composition, or other base metal, and it has hitherto been usual in such an article having top and bottom surfaces substantially parallel with square edges to solder a band of gold or gold-plated stock along the edges of a filling piece or block all around the same and to solder a top plate and a bottom plate of gold or gold-plated stock upon the top and bottom surfaces of said filling piece or block, which plates overlap and cover the edges of said band. It is, however, practically impossible to conceal the seam—that is, the line of union of said top and bottom plates with the band—and such seams disclose the fact that the article so made is not of solid gold. Moreover, the top and bottom plates and band so soldered upon the filling piece or block when highly polished in many kinds of jewelry, so reflect the light which shines upon them that the irregularities of the surfaces are apparent, producing wavy reflections which greatly diminish the beauty and appearance. If to avoid the seams along the edges of the article resulting from the soldering of a band and top and bottom plates upon the filling piece or block, as already described, (which method of manufacture, however, does result in the forming of square edges thereon,) the gold or gold plate constituting the outer covering or shell of such article is formed by striking up the blank in a die by means of a plunger operated in a drop-press, the blank so struck up must have its sides somewhat beveled in order to give a clearance from the die to remove it therefrom, and this bevel, as also the bending of an integral piece of stock to form the sides, makes it practically impossible to get a perfectly-square sharp edge for the article, and such a perfectly-square sharp edge is very desirable for such article, because heretofore only articles made of solid gold have had such edges.

It is the purpose of my invention to produce gold-filled jewelry in which the filling piece or block is condensed and hardened, the seams entirely obliterated, the edges perfectly square and sharp, and the surfaces perfectly smooth and regular, so as to reflect the light from them when polished with the same uniform luster as if the article were made of solid gold.

My improved process is adapted to the manufacture of various kinds of jewelry; but for clearness of description and explanation I will specify it as applied to the manufacture of a charm such as is worn as an ornament upon a watch-chain.

In Fig. 1 of the drawings, A represents a blank piece of gold which has been rolled into a sheet. This blank is struck up, cupped, or shaped, as usual, by a die and plunger in a drop-press into the required form, and the portion so embossed constitutes a recessed blank or lower part of the shell or covering of the article which is to be made, the turned-up sides forming the edges thereof. These sides are disposed at a slight angle or bevel, as is necessary in die-formed stock, in order to give it a proper clearance from the die to remove it therefrom. Fig. 2 is an inverted plan view of said blank A after it has been struck up, as aforesaid, and the corners of the outlying flanges have been clipped off.

B represents a piece or film of hard solder cut from a thin sheet into a shape and of a size, as seen in Figs. 4 and 5, to fit into the bottom of the cupped portion of the blank A. (Shown in Fig. 2.)

C represents the filling block or piece, cast or cut or formed from a thick sheet of brass or base metal into a shape, as seen in Fig. 6, to correspond with and loosely fit in the depressed portion of the struck-up blank. (Shown in Fig. 2.) Its edges are beveled, as shown in cross-section in Fig. 7, to fit into said depression in the struck-up blank A, which depression, as is shown in Figs. 2 and 3, has its sides beveled and flaring outwardly. This filling block or piece C is of a thickness exceeding the depth of the depression of the struck-up blank A.

The first operation is for the purpose of condensing, hardening, and fitting the filling-block C within the depression of the blank A. This operation is illustrated in Fig. 14 of the drawings, in which D represents in cross-section the die in which the blank A was struck up, (or a die similar to it,) and E represents in cross-section a plunger of a press. The blank A is placed upon the die D, with its embossed portions fitting in the matrix of said die. The piece or film B of hard solder is laid in the depression or recess of the blank A, and the filling-block C is placed in said depression in contact with the piece of solder B. It will be seen that the filling-block C, being thicker than the depth of the depression in the blank A, projects up above the flanges of the blank A. The plunger moving in the direction of the arrow in Fig. 14 strikes with great force upon the upper surface of the filling-block C and condenses and compacts it until its upper surface is flush with the flanges of the blank A, whereupon the parts A, B, and C are removed from the die D. The result of this operation is shown in Fig. 15. The sweating or soldering operation is performed by use of the sweating or soldering die F and the clamping-plate G. The sweating or soldering die F is preferably rectangular and has a central matrix in the upper side thereof, Figs. 10 and 11, of the same shape and dimensions as the matrix of the forming-die by which the blank A was originally struck up. It also has a screw-threaded tap at each corner. The clamping-plate G is rectangular or of a shape to correspond to the top surface of the die F and has at each corner a smooth cylindrical bore $g$ and a countersink $g'$ concentric therewith. A parting wash of whiting or other suitable substance is given to the matrix and surrounding portions of the die F and also to the under surface of the clamping-plate G. The composite body, which is the product of the condensing operation and which is shown in Fig. 15, is placed in the matrix of the die F, as illustrated in Fig. 16, and on the upper surface of the filling-block C so in position is laid a piece of film B' of hard solder corresponding in shape and size to the piece B (shown in Fig. 4) or a trifle larger, and on said piece B' of hard solder is laid a cover or facing-plate H, made of sheet-gold, of a size and shape preferably as shown in Fig. 8, exceeding that of the pieces B' C and extending out somewhat over the flanges of the blank A, as fully illustrated in Fig. 16. The clamping-plate G is then put on over the die F and secured thereto by the clamping-screws I, and said screws are tightened up until the plate G is in forcible contact with the upper portion of the gold covering-plate H, as seen in Fig. 16. Said die F, with the several parts A, B, C, B', and H in position, as just described, and the plate G, clamped on said die F by the screws I, are then subjected to heat, which melts the pieces B B' of hard solder *in situ*, thus uniting the filling-block C to the blank A and also to the covering-piece H, and when said die and clamping-plate have been brought to a red or fusing heat they are placed in a vise or in a hydraulic or screw press and forced together while so heated, the screws I allowing such inward movement of the plate G because of the smooth cylindrical bores and countersinks in which the shanks and heads of the screws I, respectively, are loosely mounted. By the heat and pressure so applied the solder is fused and the parts to which it is adjacent are firmly united, and at the same time any excess of such solder is squeezed or forced out and forms an outlying and irregular flange, which is subsequently trimmed off.

Fig. 17 shows the die F and clamping-plate G at the close of said sweating and forcing operation with the composite body between them. It is here seen that the clamping-plate has more nearly approached the die F and that the heads of the screws I, which before the operation were at the bottom of the countersinks g' of the plate G, as illustrated in Fig. 16, have moved up in said countersinks. It is also shown that the pieces B B' of solder have disappeared, having been melted, and that the composite body now consists of the recessed blank or shell A and covering or facing plate H and the filling-block C, the two former having been soldered and fused to the latter. When the sweating and forcing operation is thus ended and the die, clamping-plate, and the composite body between them have cooled said body is removed, and the outlying flanges thereof are cut off, so that the charm is of the shape shown in Fig. 18. This cutting operation is performed by means of the plunger J and collar K in the usual manner; but the composite body A C H so formed and trimmed has beveled sides, and it is desirable to give to it square sides or edges—that is to say, sides or edges which are at a right angle to the margin of the bottom and top plates thereof—and this result is accomplished by the following-named implements: A collar L (shown in Figs. 19, 20, and 24) has a central aperture *l* of the exact size to receive the composite body shown in Fig. 18. A forcing-block M has an upwardly-projecting bed *m* of a shape and size to snugly fit into the aperture *l* of the collar L. A plunger or forcer N has its lower end of a size and shape to snugly fit into the aperture *l* of the collar L. The sides of said aperture *l* and also the lower face of the forcer N and the upper face of the bed *m* of the forcer-block M are all highly polished. The collar L is fitted on the forcer-block M, as shown in Fig. 24, the bed *m* thereof projecting upward into the aperture *l* of said collar. The composite body (shown in Fig. 18) is placed, with its smaller side downward, in the aperture *l* of the collar L and rests upon the upper surface of the bed *m* of the forcer-block M. The forcer N has its lower end inserted in the aperture *l* of the collar L in direct contact with the cover H of the composite body. The forcer is pressed with great power in a hydraulic or other suitable press, and as the space between the walls *l* of the collar L is a confined space and said walls are at right angles with the lower surface of the forcer N and the upper surface of the bed *m* of the block M the continued pressure of the forcer N downward compels the metals of the composite body confined in said space to flow laterally, and as said body is made thinner by said pressure the beveled sides are squeezed outwardly to completely fill the said confined space. Thus the composite body is formed with square edges, which are at right angles with the margins of both the upper and lower surfaces of said composite body. This process not only hardens and condenses the metal so acted upon, but imparts to the entire exterior a perfectly smooth and polished surface, which reflects light uniformly in parallel rays. The result of this improved process is shown in top plan in Fig. 25 and in cross-section in Fig. 26, as seen on line *s s* of Fig. 25, all the exterior parts being of gold, and the filling-block of base metal being wholly concealed, while the edges are as square and right angled as if the charm were cut out of a piece of solid sheet-gold.

It is obvious that instead of using gold stock for the external parts gold-plated stock may be used, except that in such case soft solder should be substituted for hard solder or the entire filling-block should be made of some soft and easily-fusible metal and also the exposed edges of the base metal where cut should be electroplated or otherwise colored or covered with gold when the article is finished.

In case the filling-block is itself made of soft solder or of a soft and easily-fusible metal the separate pieces or layers of solder hereinbefore specified are not required.

The same die may serve as the forming and sweating die, if desired.

I claim as a novel and useful invention and desire to secure by Letters Patent—

1. The process of making square-edged, filled jewelry, which consists of the following steps: preparing a bevel-edged shell or recessed blank of the facing metal, seating a filling therein with a film of solder at both sides of said filling, placing a facing-plate over the open side of the blank, applying die-pressure to the composite article while subjected to sufficient heat to fuse the solder, whereby the excess of solder is forced out and the parts firmly united, and then squaring the beveled edge of said composite article by forcing said article into a suitable collar and causing the metals of said article to spread laterally to contact with the side walls of the aperture of said collar, substantially as described.

2. The process of making square-edged, filled jewelry, which consists of the following steps: preparing a bevel-edged shell or recessed blank of the facing metal, placing in the bottom of the recess of said blank a film of solder, seating in the said recess of the blank in contact with said film of solder a filling-block, whose thickness exceeds the depth of said recess, compacting or condensing by die-pressure said filling-block until its upper surface is flush with the upper surface of said recessed blank, placing upon the top of said filling-block a film of solder and upon the top of said last-named film of solder a facing-plate and applying die-pressure to said composite article while subjected to sufficient heat to fuse the solder, whereby the excess of solder is forced out and the parts firmly united, and then squaring the beveled edge of said composite article by forcing said article into a suitable collar and causing the metals of said article to spread laterally to contact with the side walls of the aperture of said collar, substantially as specified.

In testimony whereof I affix my signature in presence of two witnesses.

FRANK R. STAFFORD.

Witnesses:
 WARREN R. PERCE,
 HOWARD A. LAMPREY.